United States Patent [19]

Faurie

[11] Patent Number: 4,699,314

[45] Date of Patent: Oct. 13, 1987

[54] ACTUATOR FOR A HEATING/COOLING DIFFUSER

[75] Inventor: Daniel B Faurie, Camillus, N.Y.

[73] Assignee: Carrier Corporation, Syracuse, N.Y.

[21] Appl. No.: 942,885

[22] Filed: Dec. 17, 1986

[51] Int. Cl.[4] ............................................. F24F 13/10
[52] U.S. Cl. ...................................... 236/49; 137/875; 236/101 D
[58] Field of Search ................... 236/49, 93 R, 101 D; 137/625.44, 875; 251/228

[56] References Cited

U.S. PATENT DOCUMENTS

| | | | |
|---|---|---|---|
| 2,011,546 | 8/1935 | Waltenberg | 236/93 R |
| 2,022,460 | 11/1933 | Dutcher | 236/93 R X |
| 2,057,494 | 10/1936 | Leigh | 236/49 B |
| 2,462,198 | 2/1949 | Johnson | 236/93 R |
| 3,166,052 | 1/1965 | Parsons | 137/875 X |
| 3,195,441 | 7/1965 | Hedrick | 236/93 R X |
| 3,664,582 | 5/1972 | Jackson et al. | 236/93 R |
| 4,497,241 | 2/1985 | Olkata | 236/49 B X |
| 4,535,932 | 8/1985 | Herb | 236/49 |
| 4,537,347 | 8/1985 | Noll et al. | 236/49 B |
| 4,541,326 | 9/1985 | Fukuda et al. | 98/40.25 |

Primary Examiner—William E. Tapolcai
Attorney, Agent, or Firm—David J. Zobkiw

[57] ABSTRACT

A diffuser is provided with three discharges. Two of the discharges are directed in one direction and, when installed, would be directed towards the outside wall of the conditioned space. The other discharge is directed in the opposite direction and would discharge into the interior of the conditioned space. Responsive to the temperature of the conditioned air being supplied, a thermally responsive actuator of shape memory alloy is in either one of two positions whereby either one of the two discharges in the one direction or the discharge in the opposite direction is blocked. This results in two discharges in one direction or one in each direction with the discharge area being the same in both instances.

8 Claims, 6 Drawing Figures

ACTUATOR FOR A HEATING/COOLING DIFFUSER

BACKGROUND OF THE INVENTION

In diffusers selectively distributing either warm or cool air, it is common practice to use different discharges for the warm and cool air. In perimeter zones in particular, it is desirable to have heat discharged towards the outside wall while cool air is directed into the space to cool the occupants. Thermoactuators, which are thermostatic devices containing a material which undergoes a reversible phase change with an associated expansion/contraction, are often used to achieve changeover. A typical phase changing material would be a wax-like material which is solid at the supply temperature of the cool air and is liquid at the supply temperature of the warm air. The expansion of the phase changing material in going from the solid to the liquid state provides the mechanical power to achieve changeover, and reset by spring bias upon a reverse phase change.

SUMMARY OF THE INVENTION

The present invention is directed to a thermally responsive actuator for a ceiling diffuser for controlling the air distribution depending upon whether it is distributing warm or cool air. The diffuser provides a two-way discharge, as is desirable for the cooling function, and a one-way discharge having the same total discharge area located so as to direct all of the heating air towards the outside wall. This is achieved by providing a diffuser having two discharges directed toward the outside wall an one directed towards the interior of the conditioned space. One of the two discharges directed toward the outside wall is always open while one of the other two discharges is open and the other closed depending upon the character of the air being discharged. Since the two discharges subject to being opened and closed face in opposite directions and are of equal discharge area, the result is a two-way discharge for cooling and a one-way discharge for heating having the same discharge area. The one-way blow towards the outside wall on heating is the most effective in maintaining room comfort while an equal heating and cooling discharge area is required for heating with low temperature air such as plenum air. While the heating and cooling air volumes are not conventionally the same, the use of low temperature air for heating in this manner with a higher heating volume has been found to provide favorable room comfort and lower heat energy cost. Changeover from one discharge pattern to the other is achieved by converting torsional forces produced due to a crystalline phase transformation of a shape memory allow actuator into rotary movement of a swing baffle through a linkage connecting the actuator and the baffle.

It is an object of this invention to provide an actuator for a heating/cooling diffuser suitable for supplying low temperature air for heating.

It is an additional object of this invention to provide an actuator for converting torsional forces at one location, through a linkage, into rotary motion at a second location separated from the first location. These objects, and others as will become apparent hereinafter, are provided according to the teachings of the present invention.

Basically, the diffuser is provided with three discharges. Two of the discharges are directed in one direction and, when installed, would be directed towards the outside wall of the conditioned space. The other discharge is directed in the opposite direction and would discharge into the interior of the conditioned space. Responsive to the temperature of the conditioned air being supplied, a thermally responsive actuator is in either one of two positions whereby either one of the two discharges in the one direction or the discharge in the opposite direction is blocked. This results in two discharges in one direction or one in each direction with the discharge area being the same in both instances. The thermally responsive actuator is in the form of one or more torsion springs of shape memory alloy located in one discharge connected to a swing baffle through a linkage so as to control the other two discharges.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
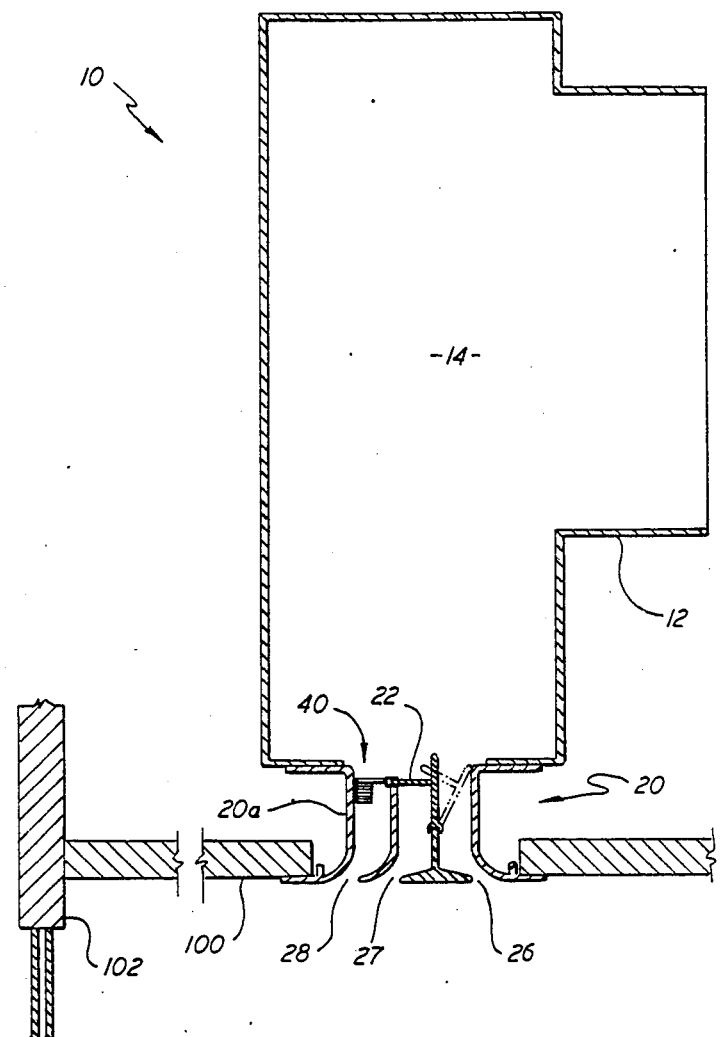
FIG. 1 is a sectional view of an air terminal employing the actuator of the present invention.

In FIG. 1, the numeral 10 generally designates an air terminal which is mounted in ceiling 100 and receives conditioned air via duct 12. The conditioned air supplied via duct 12 is delivered to plenum 14 which contains the actuator structure generally designated 40 and which is in fluid communication with the diffuser assembly 20. The diffuser assembly 20 includes a swing baffle or director 22 and three horizontal discharges 26, 27 and 28, respectively. The director 22 is illustrated in a position blocking discharge 27 whereby the conditioned air flows from discharges 26 and 28 which are in opposite directions. Director 22 is shown in phantom blocking discharge 26 whereby the conditioned air flows from discharges 27 and 28 which are in the same directions. The reason that different distribution patterns are desirable for heating and cooling is that the heating load is always located at the outside wall and the cooling load is produced both at the outside wall and in the exterior spaces by the occupants, light and machinery which are supplemental heat sources in the heating mode but additional loads in the cooling mode. Therefore, in the heating mode it is only necessary to overcome the external heating load and conditioned air is only directed towards the outside wall. In the cooling mode, however, in addition to directing the conditioned air towards the outside wall to overcome the external cooling load, it is also desirable to direct conditioned air inwardly to overcome the cooling load supplied by the occupants, machinery and lights.

Figure 2:
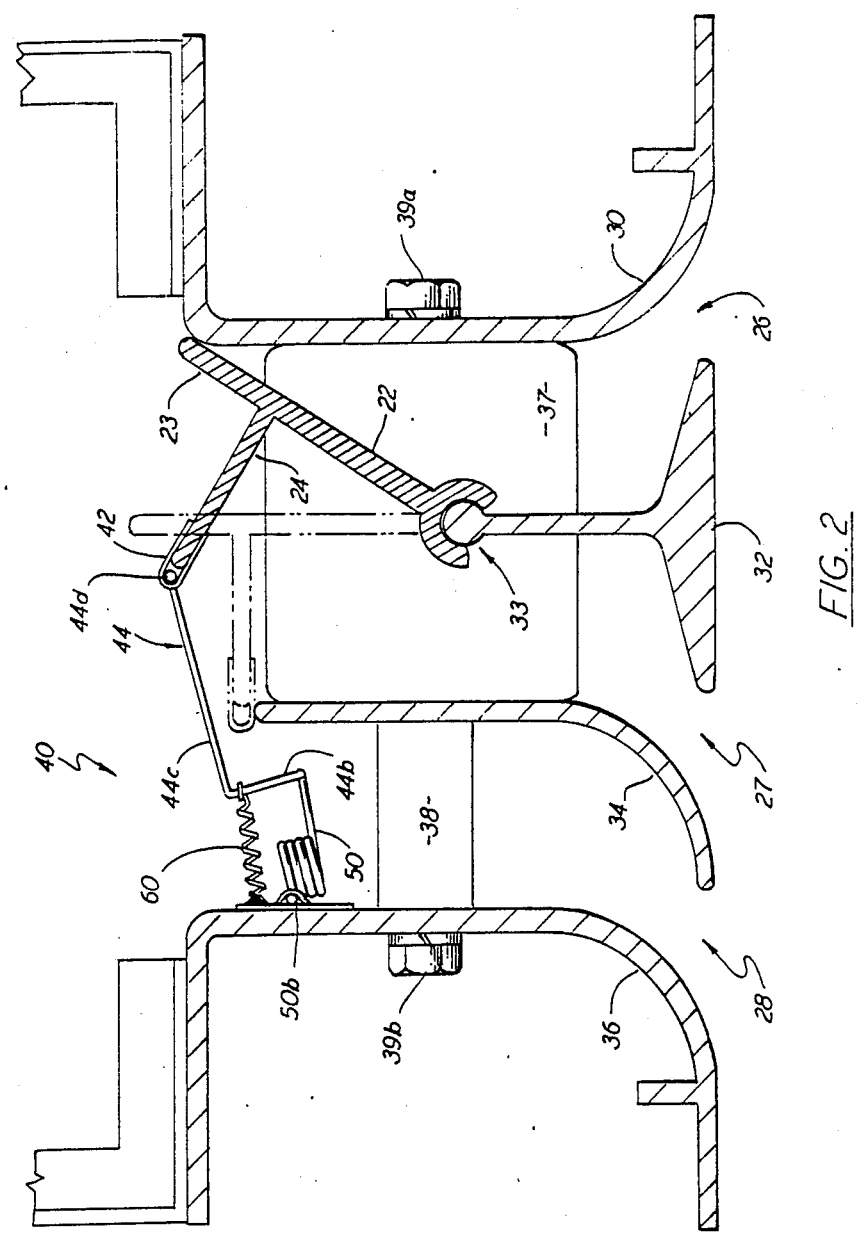
FIG. 2 is a sectional view of a diffuser employing a first embodiment of the present invention.
Figure 3:
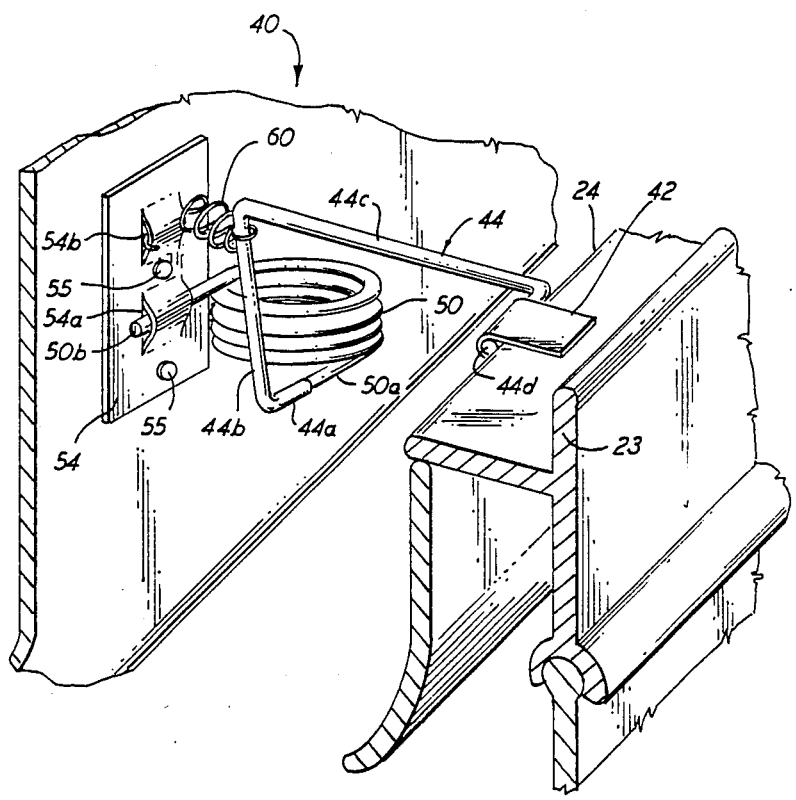
FIG. 3 is a perspective view of the thermal actuator of FIG. 2.

Referring now to FIGS. 2 and 3, the swing baffle or director 22 has a vertical arm 23 and a horizontal arm 24 which serve as valves. The horizontal arm 24 is connected to the actuator structure 40 by U-clip 42. Specifically, U-clip 42 pivotably connects horizontal arm 24 to link 44. Link 44 is made up of a plurality of straight portions, or legs, 44a-d which are connected by bends. Leg 44a is attached by crimping or any other suitable means to end 50a of torsion spring 50 which is made of a nickel-titanium or brass shape memory alloy and is inserted therein. Legs 44b and c form an acute angle defining a notch for receiving one end of return spring 60. Leg 44d is pivotably received in U-clip 42. Ends 50a and b of torsion spring 50 extend tangentially from the coils defining torsion spring 50 and are parallel to each other. End 50b is received in opening 54a and thereby secured to actuator support 54 which is secured to side diffuser 36 by rivets 55. Actuator support 54 can be of metal or molded plastic, and further includes opening 54b for receiving one end of spring 60.

Torsion spring 50 thus has one end 50b secured to side diffuser 36 while link 44 has end 44a secured to end 50a of spring 50 and end 44d pivotably secured to swing baffle 22 by U-clip 42. Tension spring 60 is secured in opening 54b of actuator support 54 and at the bend connecting legs 44b and c to normally position the members defining actuator 40 as illustrated in FIG. 3. Shape memory alloy spring 50 will ordinarily be made from an alloy chosen to have a crystalline phase transformation in the 70° F. to 80° F. range. At the transition temperature of the crystalline phase transformation, there is a sudden dimensional change and if ends 50a and b are considered to be two arms connected by a curved member, as in a Bourdon tube, the movement of the ends is towards a straightening when the temperature is raised to the transition temperature and towards a bending when the temperature is lowered. Compared to phase change materials such as waxes, the mass of the shape memory alloy to be heated/cooled is small, and there is a reduction in the amount of additional force produced after transition due to thermal expansion/contraction. The straightening movement of end 50a due to heating moves link 44 against the bias of spring 60 and movement of leg 44d of link 44 produces rotary motion of swing baffle or director 22 causing arm 23 to serve as a valve by blocking flow through discharge 26 while arm 24 is moved from blocking flow in discharge 27. The reverse happens upon cooling. However, this configuration permits the usage of a thermally responsive actuator while minimizing the interference with the air flow.

As is best shown in FIG. 2, discharge 26 is defined between side diffuser 30 and center diffuser 32. Discharge 27 is defined between center diffuser 32 and center divider diffuser 34 while discharge 28 is defined between center divider diffuser 34 and side diffuser 36. A diffuser spacer 37, grommet 38 and bolts 39a and b are located at each end of the diffuser assembly 20 and secure the side diffusers 30 and 36, center diffuser 32 and center divider diffuser 34 in place.

In operation, the conditioned air is always flowing over the shape memory alloy spring 50 which is located in discharge 28. Whenever the conditioned air is at a temperature less than that of the crystalline phase transformation, swing baffle or director 22 is in the solid line position of FIG. 1 and the position of FIG. 3 whereby arm 24 blocks discharge 27. In this position, cool air passes through discharge 28 towards the outside wall 102 and through discharge 26 towards the interior of the conditioned space where the occupants, machinery and lights provide a cooling load. If the conditioned air is switched over to heating, the conditioned air temperature will be above the temperature of the crystalline phase transformation of shape memory alloy spring 50. When spring 50 has been sufficiently heated, the crystalline phase transformation takes place which tends to straighten ends 50a and b with respect to each other against the bias of spring 60 and causes spring 50 to move to the solid line position of FIG. 2. The movement of spring 50 results in movement of link 44 which in turn causes the rotation of swing baffle or director 22 from the solid line position of FIG. 1 to the solid line position of FIG. 2, whereby arm 23 blocks discharge 26. In this position, warm air passes through discharges 27 and 28 so that all of the warm air is directed towards the outer wall 102, the only heating load.

In the movement of the actuator 40 and swing baffle 22 from the FIG. 1 to the FIG. 2 position, it will be noted that a linkage is established with the two fixed points being the point of attachment of end 50b of spring 50 and the pivot point of swing baffle 22 with respect to center diffuser 32 with which it forms a ball and socket connection 33. Specifically, as clearly shown in FIG. 2, spring 50 is caused to rotate about end 50b as a result of the rotational movement of leg 44b of link 44 due to the forces produced by the movement of end 50a against the bias of spring 60 as ends 50a and b move apart. Since link 44 is a single member, the movement of leg 44b is in concert with the movement of the other legs. Leg 44c is connected to swing baffle 22 by leg 44d which coacts with U-clip 42 to pivotably connect link 44 with respect to swing baffle 22. As motion of swing baffle 22 is limited to rotational movement about the fixedly located ball and socket connection 33, link 44 must also rotate about the pivot defined by U-clip 42. Thus link 44 is acted on at three movable points, its connection to end 50a, its connection to spring 60 and its connection to swing baffle 22. As a result of the forces acting on link 44 its movement is both linear and rotational since none of its points are fixed.

Figure 4:
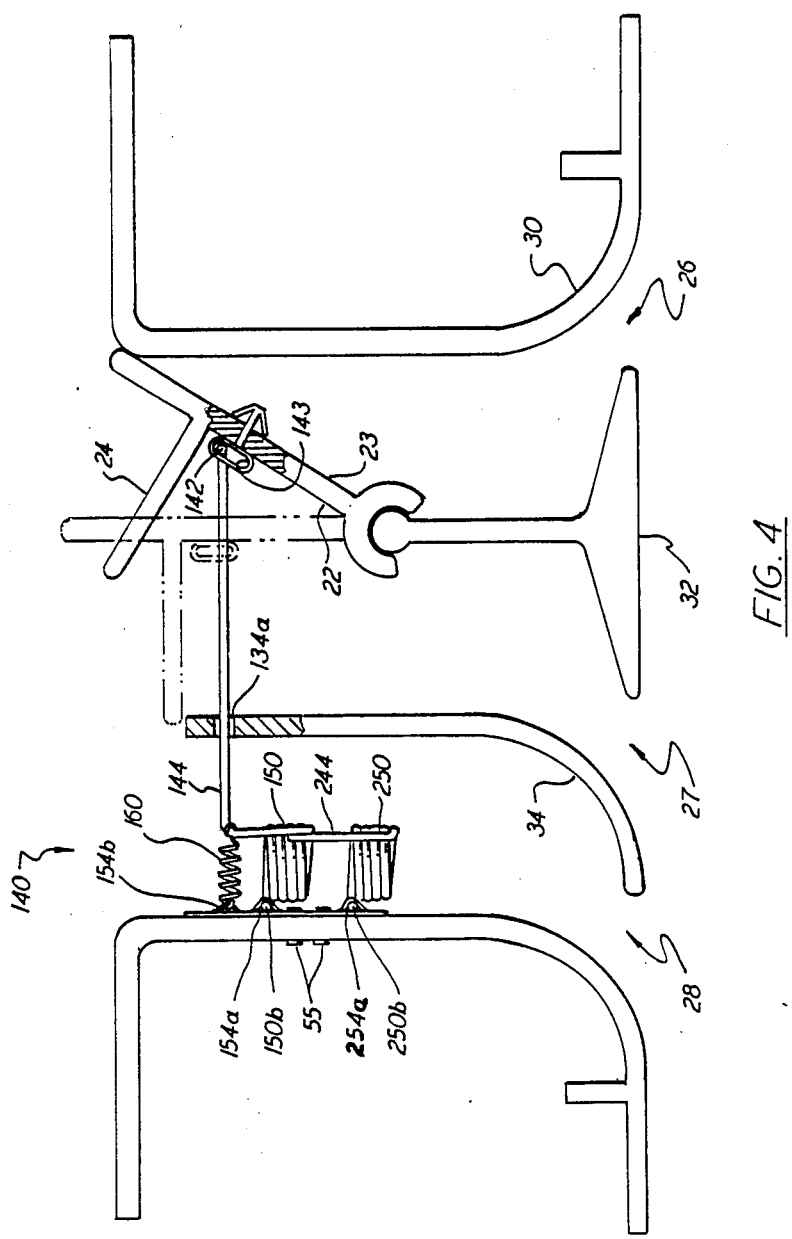
FIG. 4 is a sectional view of a diffuser employing a second embodiment of the present invention.
Figure 5:
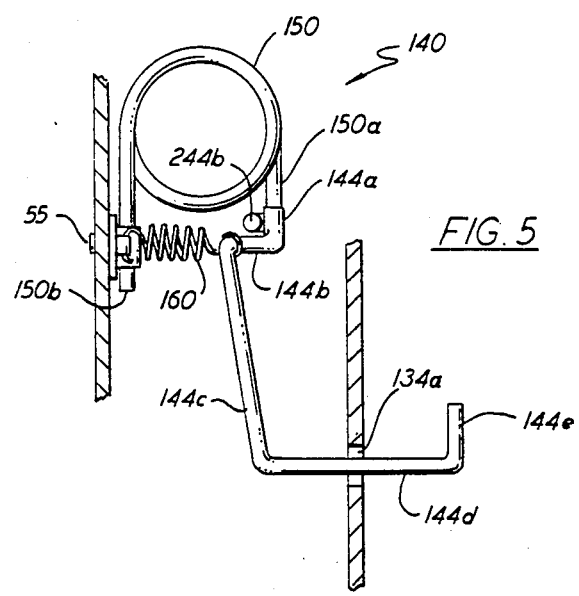
FIG. 5 is a top view of the thermal actuator of FIG. 4.
Figure 6:
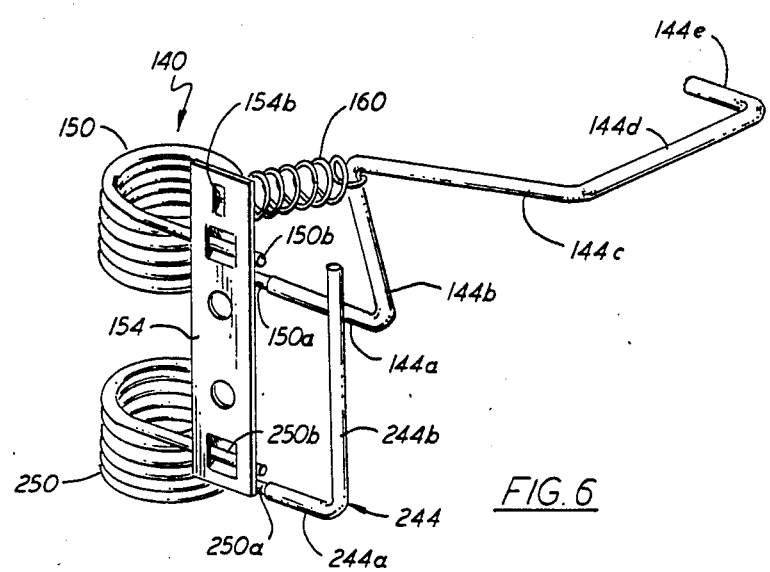
FIG. 6 is a perspective view of the thermal actuator of FIG. 4.

A second embodiment of the present invention is illustrated in FIGS. 4-6 where corresponding structure has been labeled 100 higher than the corresponding structure of FIGS. 1-3. The embodiment of FIGS. 4-6 differs from that of FIGS. 1-3 in the use of plural shape memory alloy springs, the guided movement of the link and the location and details of attachment of the link to the swing baffle. Actuator 140 includes shape memory alloy torsion springs 150 and 250 having ends 150a and b and 250a and b, respectively, extending tangentially from the coils defining springs 150 and 250, respectively, and parallel to each other. Ends 150b and 250b are received in openings 154a and 254a and are thereby secured to actuator support 154 which is secured to side diffuser 36 by rivets 55. Actuator support further includes opening 154b for receiving one end of tension spring 160 which provides a return bias. Link 144 is made up of a plurality of straight portions, or legs, 144a-e which are connected by bends. Leg 144a is attached by crimping or any other suitable means to end 150a of torsion spring 150 which is inserted therein. Legs 144b and c form an acute angle defining a notch for receiving the other end of tension spring 160. Leg 144d is loosely slidably received in a slot 134a so as to be generally limited to a reciprocating movement transverse to the flow of conditioned air while permitting all necessary movement. Slot 134a does permit a degree of lateral movement for which it serves as a pivot point and, if desired or necessary, may be defined by a low friction annular member such as a grommet received in an opening in center divider diffuser 34. Leg 144e is slidably received in slot 143 of slot headed plug 142 which is snap fitted or otherwise suitably secured to vertical arm 23 of swing baffle or director 22 at a point beneath horizontal arm 24. Second torsion spring 250 has an end 250a which is received in and attached to leg 244a of link 244 by crimping or any other suitable means. Link 244 includes horizontal leg 244a and vertical leg 244b which are connected by a bend. Leg 244b engages leg 144a on the side of leg 144a closest to side diffusers 36 so that springs 150 and 250 act cumulatively in opposition to spring 160.

In operation of the embodiment of FIGS. 4-6, if springs 150 and 250 are heated such that they undergo a crystalline phase transformation movable ends 150a and 250a will tend to separate from fixed ends 150b and 250b, respectively. Movement of end 250b causes leg 244b to push against leg 144a which is also moving due to the movement of end 150b. Movement of ends 150b and 250b is opposed by spring 160 which cannot prevent movement due to the crystalline phase change.

Unlike the embodiment of FIGS. 1-3, link 144 is located in slot 134a. While slot 134a does permit the necessary degree of vertical and horizontal pivoting motion of link 144 there is primarily a reciprocating motion with respect to slot 134a. As a result, the tipping movement to which spring 50 of the FIG. 1 device is subject, is restrained by slots 134a and 143. As link 144 reciprocates with respect to slot 134a, leg 144e coact with slot 143 to cause swing baffle or director 22 to move to the FIG. 4 position responsive to the supplying of conditioned air. If cool air is supplied such that the springs 150 and 250 are cooled below the crystalline phase transformation then the movements of ends 150b and 250b in conjunction with spring 160 pivots baffle or director 22 so that discharge 27 is blocked.

From the foregoing it is clear that springs 50, 150, and 250 provide a torsional movement of their ends responsive to the reaching of the crystalline phase transformation point by heating or cooling. Springs 60 and 160 provide a return bias. In the embodiment of FIGS. 4-6 compounding of shape memory actuators is disclosed so as to permit the increasing of the forces. Where there are high flows, such as 400 cfm, or higher, the flow impinging upon legs 23 and 24 may provide a significant force requiring a stronger actuator. Also, the forces tending to return the shape memory alloy to its original shape are not necessarily equal to those tending to change its shape due to the different configuration at the time of each change, and the resultant differences in location and direction of the exerted forces.

Although a preferred embodiment of the present invention has been described and illustrated, other changes will occur to those skilled in the art. It is therefore intended that the present invention is to be limited only by the scope of the appended claims.

What is claimed is:
1. A thermally responsive actuator comprising:
first helical spring means of shape memory alloy having first and second ends extending in a generally parallel direction when said shape memory alloy is at a temperature below the crystalline phase transformation temperature;
tension spring means having first and second ends;
actuator support means having a first attachment portion for fixedly securing said first end of said helical spring means and a second attachment portion for securing said first end of said tension spring means;
link means having first and second ends and including a plurality of legs connected by bends with at least one bend defining an acute angle said first end of said link means being fixedly connected to said second end of said helical spring means and said second end of said tension spring means connected to said link means at said at least one bend defining an acute angle;
pivotable means pivotable about a fixed point between two positions connected to said second end of said link means whereby when said helical spring is at a temperature below the crystalline phase transformation said tension spring provides a bias for positioning said pivotable means in a first one of said two positions and when said helical spring is at a temperature above the crystalline phase transformation said second end of said helical spring moves away from said fixedly secured first end of said helical spring means against the bias of said tension spring means to cause movement of said link means to move said pivotable means into said second one of said positions.

2. The thermally responsive actuator of claim 1 wherein said second end of said link means is connected to said pivotable means by means defining a pivotal connection.

3. The thermally responsive actuator of claim 1 further including means for generally limiting motion of said link means to reciprocating motion with respect to said pivotable means and said second end of said link means is connected to said pivotable means by means defining a slidable connection.

4. The thermally responsive actuator of claim 1 wherein said actuator support means includes a third attachment portion and further including a second helical spring means of shape memory alloy having first and second ends wirh said first end of said second helical spring means fixedly secured to said third attachment portion and said second end of said second helical spring means coacting with said link means cumulatively with said first helical spring means.

5. In a diffuser means for supplying conditioned air to a space and including a plurality of discharges and pivotable means for blocking selected ones of said plurality of discharges a thermally responsive actuator comprising:
first helical spring means of shape memory alloy having first and second ends extending in a generally parallel direction when said shape memory alloy is at a temperature below the crystalline phase transformation temperature;
tension spring means having first and second ends;
actuator support means having a first attachment portion for fixedly securing said first end of said helical spring means and a second attachment portion for securing first end of said tension spring means;
link means having first and second ends and including a plurality of legs connected by bends with said at least one bend defining an acute angle said first end of said link means being fixedly connected to said second end of said helical spring means and said second end of said tension spring means connected to said link means at said at least one bend defining an acute angle;

pivotable means pivotable about a fixed point between two positions connected to said second end of said link means whereby when said helical spring is at a temperature below the crystalline phase transformation said tension spring provides a bias for positioning said pivotable means in a first one of said two positions and when said helical spring is at a temperature above the crystalline phase transformation said second end of said helical spring moves away from said fixedly secured first end of said helical spring means against the bias of said tension spring means to cause movement of said link means to move said pivotable means into said second one of said positions.

6. The thermally responsive actuator of claim 5 wherein said second end of said link means is connected to said pivotable means by means defining a pivotal connection.

7. The thermally responsive actuator of claim 5 further including means for generally limiting motion of said link means to reciprocating motion with respect to said pivotable means and said second end of said link means is connected to said pivotable means by means defining a slidable connection.

8. The thermally responsive actuator of claim 5 wherein said actuator support means includes a third attachment portion and further including a second helical spring means of shape memory alloy having first and second ends with said first end of said second helical spring means fixedly secured to said third attachment portion and said second end of said second helical spring means coacting with said link means cumulatively with said first helical spring means.

* * * * *